July 1, 1958 J. M. CUNNINGHAM 2,841,221

PUNCHING MECHANISMS WITH COORDINATED PUNCH CHECKING MEANS

Filed July 19, 1954 4 Sheets-Sheet 1

INVENTOR.
JAMES M. CUNNINGHAM

BY Paul W. Lounitzer
attorney

INVENTOR.
JAMES M. CUNNINGHAM
BY Frank W. Lovinitzer
attorney

INVENTOR.
JAMES M. CUNNINGHAM
BY Frank W. Lounsifer
attorney

PUNCHING MECHANISMS WITH COORDINATED PUNCH CHECKING MEANS
Filed July 19, 1954 4 Sheets-Sheet 4
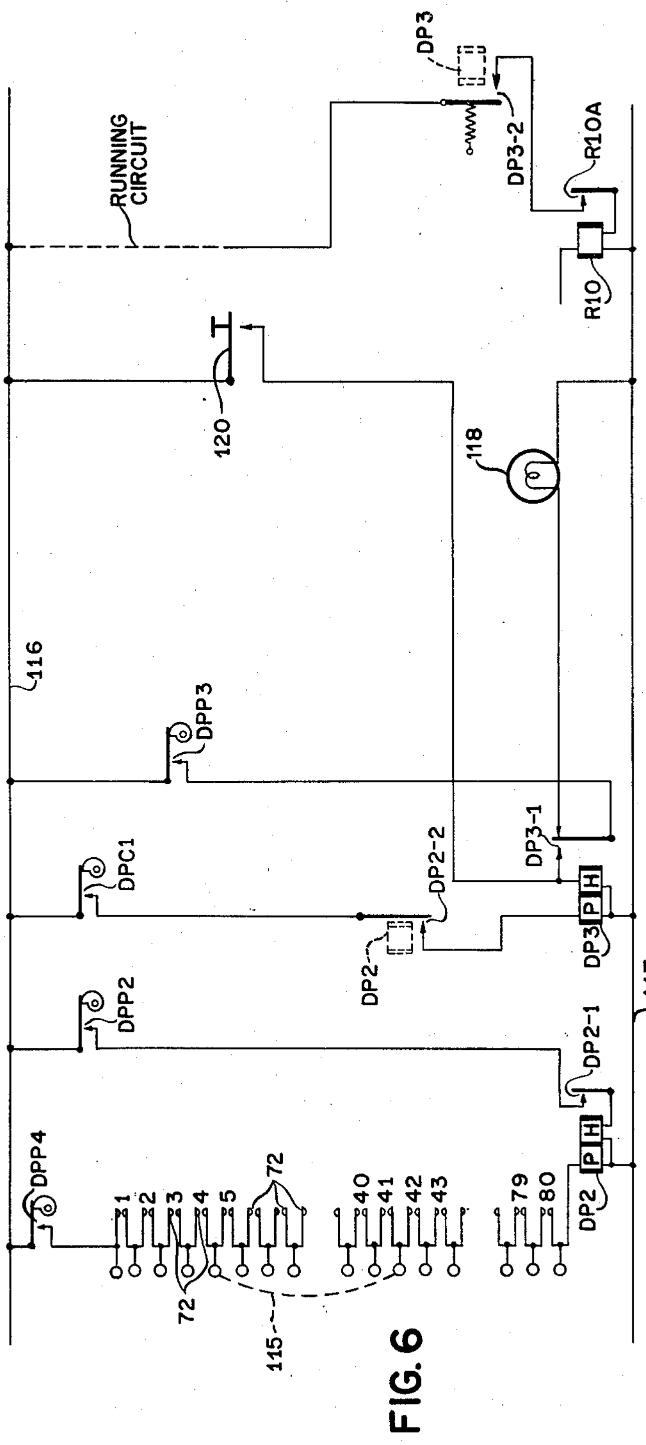
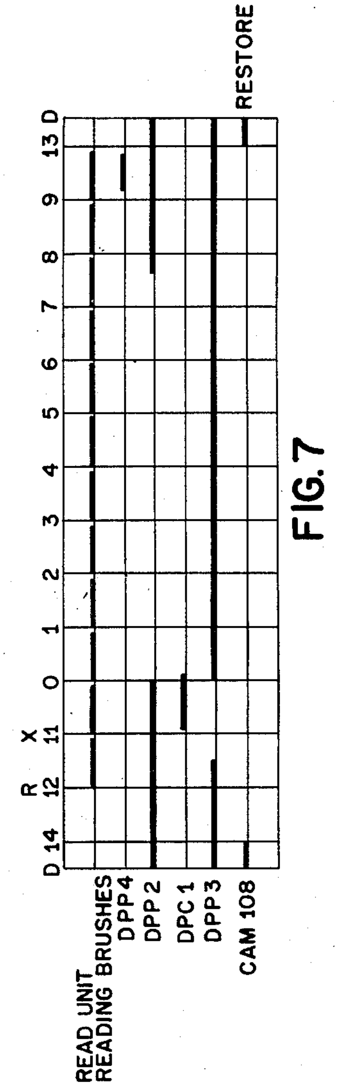
FIG. 6
FIG. 7
INVENTOR.
JAMES M. CUNNINGHAM
BY Frank W. Lomnitzer
Attorney United States Patent Office
2,841,221
Patented July 1, 1958

2,841,221

PUNCHING MECHANISMS WITH COORDINATED PUNCH CHECKING MEANS

James M. Cunningham, Endicott, N. Y., assignor to International Business Machines Corporation, New York, N. Y., a corporation of New York Application July 19, 1954, Serial No. 444,091

12 Claims. (Cl. 164—111)

This invention relates to machines which operate in conjunction with punched cards and more particularly to punching machines of the type which are provided with means to detect the presence of superfluous perforations or the absence of a perforation in the column where one should be present.

Machines of the type shown herein operate in conjunction with a form of card known as the IBM card in which a single hole in a column represents a numeral and each of the card columns is to be perforated with a single hole to represent one of the digits 0–9. Improper or erroneous punching in these columns is regarded as the presence of more than one perforation in a column or the absence of a perforation. It is to detect such errors that the present improvement has been devised.

The present invention has for its object the provision of means for detecting solely under control of the punching mechanism incorrectly punched cards of the character described.

In carrying out this broad object it was desired to provide an inexpensive means solely controlled by the punching mechanism for detecting improperly punched cards which dispense with the necessity of means for sensing punched cards after their punching operation. In carrying out this object such detecting means is operated under control of the punching mechanism so as to detect improper punching as the card is actually punched.

In prior devices, such as exemplified in the patent to Keedy No. 2,500,288, patented March 14, 1950, a sensing station was necessary to sense punched cards and relays were utilized for representing, by their operated or normal contacts whether punching was properly or improperly performed. In the present improvement such relays are completely eliminated and as a result of the saving in space all card columns may have an associated checking device and such checking devices may be selected for operation in accordance whether it is desired to check associated columns for proper punching operations.

In more detail it is, therefore, an object of the invention to devise an error detecting circuit solely controlled by the punching mechanism and which eliminates the use of sensing mechanism and controlled relays and by a saving in space enables a checking device for each card column.

According to the present invention there is associated with the punching devices normally open electrical contacts which, upon the first punching stroke, have their position changed to effect closure of such contacts. If all card columns have been properly punched the associated contacts will all be in closed position, thereby enabling an electrical test circuit to be directed through the series connected contacts. The contact operating means under control of the punch device has further provision for opening the contacts by a second punching stroke, thereby having one or more contacts open when improper punching has been performed in the associated columns. Hence, the test circuit will not be completed and a suitable signal can be given to indicate this fact to the operator. The absence of a punching stroke which indicates a blank column will enable the associated contacts to remain open, thereby opening the test circuit through the series connected contacts.

Any suitable means may be provided for adjusting the contacts to a closed position upon the first punching stroke and re-opening them upon the second punching stroke and herein preferably comprises slidable latches which may have two successive positions; the first of which causes the contacts to close and the second to cause the contacts to be restored to open position. Suitable means is also provided to restore the slidable latch plates to normal position at the termination of each cycle in order to restore the contacts to normal open position.

Other objects of the invention will be pointed out in the following description and claims and illustrated in the accompanying drawings, which disclose, by way of example, the principle of the invention and the best mode which has been contemplated, of applying that principle.

In the drawings:

Fig. 6 is a wiring diagram of the machine, and

Fig. 7 is a timing diagram.

Figure 1:
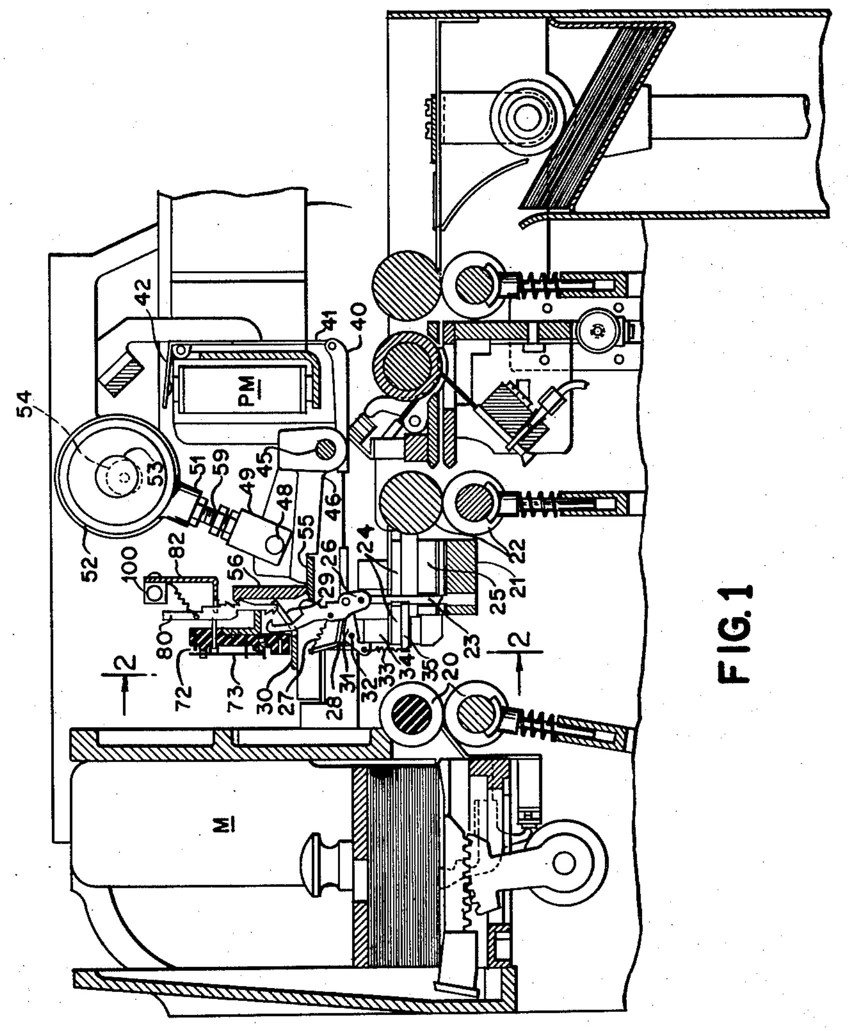
Fig. 1 is a longitudinal sectional view showing one type of punching machine for perforating records in which the present invention may be embodied.

The present invention may be incorporated in various forms of record, tape or card punching machines but is preferably incorporated in the form of the punching machine fully shown in the patent to G. F. Daly, No. 2,531,873, which shows a card punching machine of a well known construction.

The cards to be perforated are successively fed from a magazine M (Fig. 1) so that the leading edge enters a first set of feed rollers 20 which feed the card over a die plate 21 so that the leading edge is then engaged by a second set of feeding rollers 22.

The perforating mechanism includes punches 23 which are guided for vertical movement in a stripper plate 25, a plate 24 and in holes in the die plate 21. Pivotally mounted on the upper end of each punch 23 is a punch operating hook 26 which is urged in a counterclockwise direction by a spring 27 (see also Fig. 5) anchored to a spring anchoring plate 28. The upper end of the hook is adapted to fit in a slot 29 of a slotted guide plate 30 to guide the rocking movement of the hooks 26 about their pivotal connection to the related punch 23. Movement of the hooks in a counterclockwise direction is limited by stop dogs 31 (Fig. 1) which are in alignment with the hooks 26, and the latter normally rest against the ends of the dogs 31. The dogs 31 are pivoted on a wire 32 and are actuated by springs 33, each dog having a stop portion bearing against the left-hand side of a block 34 which is mounted on the plate 24 and supports both a spring anchoring bar 35 and the wire 32.

Each punch is connected by a link 40 (Fig. 1) to an arm 41 forming part of an armature 42 adapted to be attracted by the associated punch magnet PM when the latter is energized.

Pivoted on a cross-shaft 45 is a punch operating frame 46 to which is pivotally connected by means of a pin 48 a socket 49 receiving one of the threaded ends of a double screw rod 59 having right and left-hand threads, respectively, the other end of which is threaded in a member 51 which acts as a housing for a circular strap or roller bearing 52. The inner part of the strap or roller bearing 52 is mounted on an eccentric portion 53 of a cyclically operable operating shaft 54. The screw rod 59 is provided with the usual lock nuts and a hexagonal portion at the center to enable the angularity of the frame 46 to be adjusted relative to the horizontal. To the left-hand edge of the frame 40 there is attached a punch operating bar or plate 55 (see Fig. 5). Extending parallel with the punch operating bar 55 and the row of punch hooks 26 is a knockoff bar 56.

There is a punch 23, an associating operating hook 26 and a punch magnet PM associated with each vertical column of the card which, in the present case, will require that the machine be equipped with 80 punches, their associated PM magnets and other parts. Shaft 54 (Fig. 1) corresponds to the shaft 231 of the Daly Patent No. 2,531,873 and is driven in the same manner and vibrates the frame 46 continuously while the machine is running. When a magnet PM is energized its armature 42 will rock the arm 41 counterclockwise and draw the link 40 to the right. This rocks the punch operating hook 26 in a clockwise direction, allowing it to hook over the edge of the punch bar 55 after the latter has been moved slightly downwardly a small distance. A notch 60 (Fig. 5) of the hook 26 is now engaged by the punch plate 55 which pushes the punch 23 downwardly through a card between the stripper plate 25 and die 21.

Upon the return stroke of the frame 46 and deenergization of the magnet PM, the spring 27 will draw the hook 26 back to the position of Fig. 1. In the event that the armature 42 should stick to the poles of the magnet PM, the upper round nose 61 (Fig. 5) will engage a beveled edge 62 of the knockoff plate 56 to thereby cam the hook 26 in a counterclockwise direction to force the notch 60 out of engagement with the punch plate 55, the beveled edge 62 being formed as a cam surface for this purpose.

The dogs 31 (Fig. 1) are provided to prevent breakage of the punches. Formerly the movement of punch operating hooks 26 was limited by slots in the bar 213 shown in the Daly Patent No. 2,531,873 and if a punch hook 26 was only partly hooked on the punch plate 55 the hook 26 would jam and bend its punch 23 sufficiently to break it. The springs 33 yield when a condition like this occurs and allows the dogs 31 to rock slightly clockwise, thereby providing a little more clearance space for the hook 26 which may not be properly seated to descend without risk of breaking the punch.

The pairs of feeding rollers 20 and 22 are driven intermittently, one index point position at a time and the timing is such that the movement of the card is arrested while the punches are passing through the card. In other words, the card is fed one index point position and temporarily stopped to allow time for the punches to perforate, then is advanced to the next index point position. In the present case the cards are fed from the magazine with the 12 or R index point position leading the 12 holes in a plurality of vertical columns being perforated first and then the 9 holes last. In other words, if the card represents alphabetical information the R, X (11) and 0 (10) holes are first perforated and thereafter the digital holes are then perforated in the order 1, 2, 3 . . . 8, 9. If the fields of the card are to be punched with only numerical information, it is obvious that perforating is effected in the order 0, 1, 2, 3 . . . 8, 9.

The means for driving the feed rollers and operating the punch plate 55 in the proper timed relationship is exactly as shown and described in detail in the aforementioned patent to Daly No. 2,531,873 to which recourse may be had for further details of construction and operation. So much of the mechanism which is common and believed to be necessary to understand the present invention has been described.

*Double punch and blank column detection device*

The present device is mounted over the punching mechanism and is operated by the punch hooks 26 during the punching strokes. Upon completion of the punching strokes there is an indication whether the column has received a double punching or has failed to receive a punched hole. In general, the mechanism consists of a series of normally opened contacts; one for each column which is operated by an associated slide latch. The slide latch is moved one tooth by the first punching stroke which closes the contacts. If a second hole is punched the slide latch is moved a second tooth by the second punching stroke, thus re-opening the contacts. In the event there is no punch operation the slide latch will not be moved and the contacts will remain open.

Figure 2:
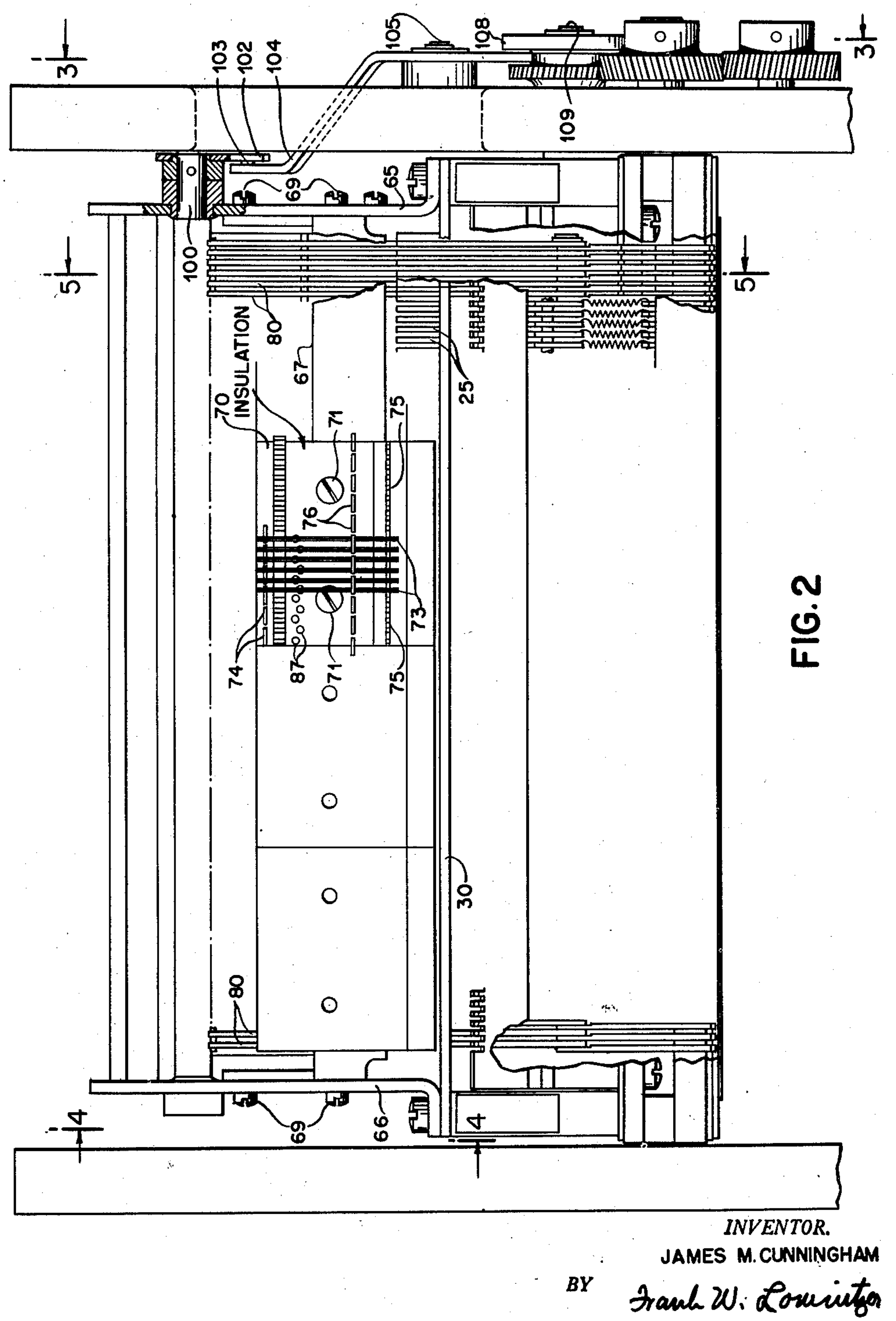
Fig. 2 is a view taken on the line 2—2 of Fig. 1 but on a much larger scale.
Figure 5:
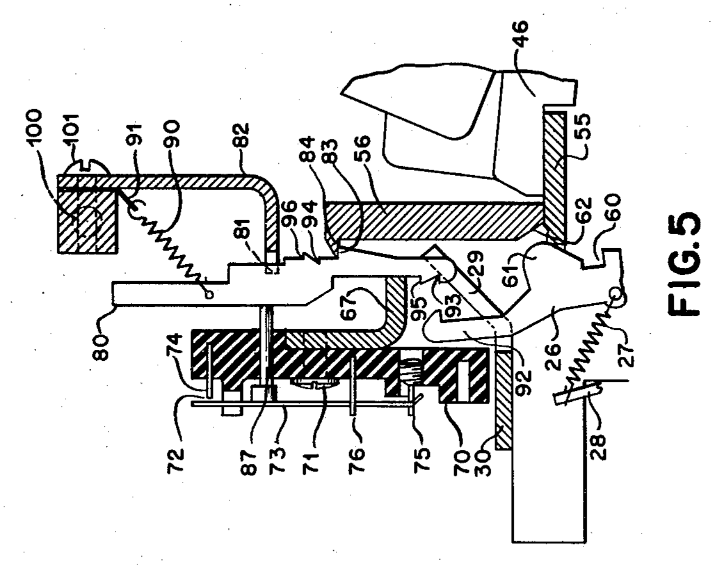
Fig. 5 is a sectional view taken on the line 5—5 of Fig. 2.
Figures 3, 4:
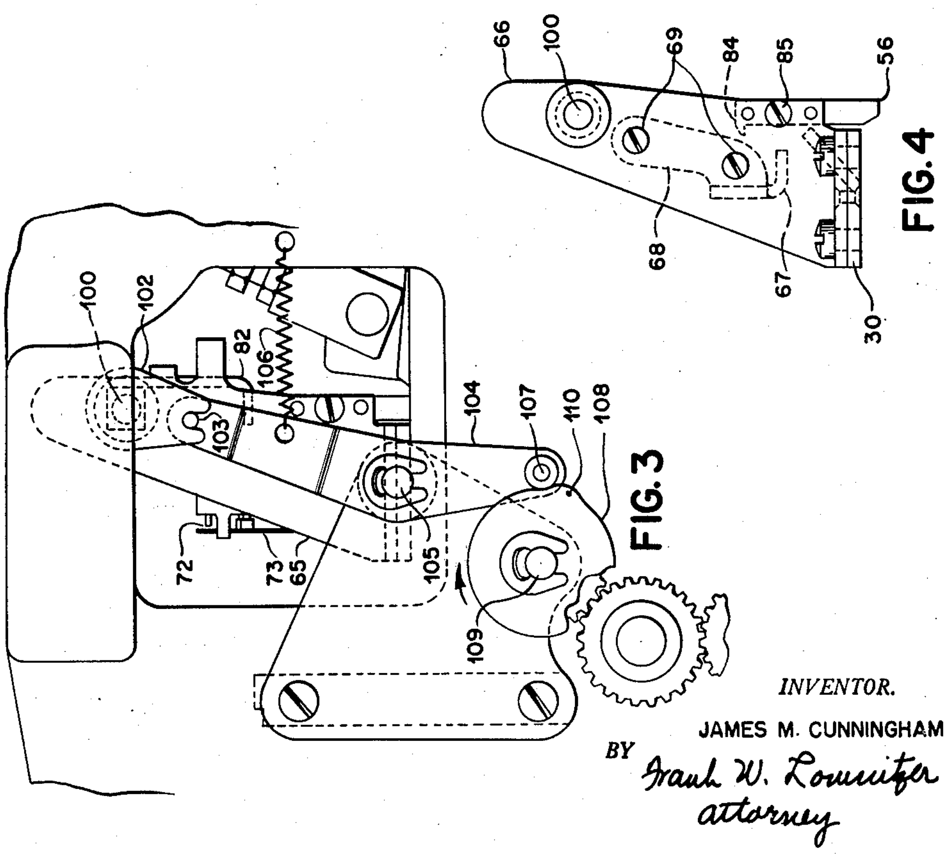
Fig. 3 is an end view taken on the line 3—3 of Fig. 2 but on a reduced scale.
Fig. 4 is an end view taken on the line 4—4 of Fig. 2 showing one of the side frame plates which carries parts of the present improvement.

Referring to Figs. 2, 3 and 4, attached to the plate 30 are upstanding spaced right and left side frame plates 65 and 66 which carry the present blank column and double punch detection device. An L-shaped bar 67 has side plates 68 (Fig. 4) which are fastened to the side frame plates 65 and 66 by screws 69. A bar 70 of insulating material is attached to the vertical portion of the L-shaped bar 67 by screws 71 and said bar carries eighty contacts. Each of the contacts 72 consists of a bundle of resilient contact wires 73 (Figs. 2 and 5) and a fixed contact 74, wires 73 being pivoted at 75 so that the wires may be moved by their inherent resiliency to contact the fixed contacts 74 or to be moved against their inherent resiliency to retain the contacts 72 open, as shown in Fig. 5.

The checking circuit to be described hereinafter requires that contacts 72 be wired in series and this is preferably accomplished by having a series of fixed contacts 74 embedded in bar 70, each of which, as shown in Fig. 2, is sufficiently wide to engage a pair of adjacent contact wires 73. Between the pivot points 75 and the fixed contacts 74 there are supplemental bridging contacts 76 also embedded in insulating bar 70 but each of these engages adjacent contact wires 73 which are not bridged by the fixed contacts 74. Hence, it is obvious from Fig. 2 that with such alternating arrangement of the bridging contacts 76 and fixed contacts 74 the eighty contact devices 72 are in series in an electrical manner.

A slidable latch 80 is provided for each column and each is slidably mounted in the associated slot 29 and in a slot 81 of a slotted inverted L-shaped plate 82 which, for the present, may be regarded as stationary. In the normal position of each slidable latch 80 the lowermost step shoulder 83 is caught under an extension or projection 84 of the knockoff bar 56. Knockoff bar 56 is also carried by the side frame plates 65 and 66 (see Fig. 4) and attached thereto by screws 85. A contact operating button 87 (Fig. 5) is slidably mounted in a related hole in the insulating bar 70 and each is between the left side edge of a slidable latch 80 and the associated contact wires 73. From Fig. 2 it will be seen that the contact operating buttons 87 are staggered in two rows for convenience in mounting. A spring 90 interconnected between each slidable latch 80 and a spring anchor plate 91 carried by the inverted L-shaped plate 82 normally retains the lowermost step shoulder 83 against the extension 84 with the lowermost portion of the slidable latch 80 resting against the transverse bar 67, button 87, however, being in such position that it will keep contact wires 73 to the left sufficiently so that related contacts 72 are normally open. The above is the normal relationship of the parts and it will now be assumed that an impulse has been transmitted to the punch magnet PM to effect the first operating stroke of punch 23. When the punch operating hook 26 is moved clockwise as a result of the energization of the PM magnet, a hook 92 (Fig. 5) at the uppermost portion of punch operating hook 26 will engage the lowermost notch 93 of the related slide latch 80 whereupon movement of the punch operating hook 26 and the punch 23 downwardly effected by the punch plate 55 will cause the slide latch 80 to be moved downwardly one step against the action of the spring 90. In said first step of movement a notch 94 which is just above the first step shoulder 83 will now catch under the projection 84 of the knockoff bar 56. Said notch 94 is more inward than the first step shoulder 83, permitting a slight clockwise movement of the slide latch 80 about bar 67 and sufficient to enable the button 87 to be moved by the resilient action of associated contact wires 73 so that the latter engage the associated fixed contact 74 and thereby close the related contacts 72. Therefore, the first operating stroke of the punching mechanism causes the closure of associated contacts 72 and said contacts remain closed during the punching of the card unless there is a further punching stroke.

Upon the counterclockwise movement of the punch operating hook 26, when the punch is returned upwardly, hook 92 will be disengaged from the notch 93 and said hook 92 will now be aligned with the second notch 95 of the slide latch 80.

In the event that a second impulse is transmitted to the punch magnet PM which would effect a double punching in the column, whereas it is desired in the present machine that only a single punching be effected, the downward movement of the punch operating hook 26 will, through engagement of hook 92 and second notch 95, effect a second downward step of movement of the slide latch 80, at which time the third notch 96 which is above the notch 94 will be caught underneath the projection 84. The notch 96 is substantially in the same inward relationship with regard to the slide latch 80 as the first step shoulder 84 and it will, therefore, cause a slight counterclockwise movement of the slide latch 80 about the bar 67 so that contact button 87 will force the associated contact wires 73 to the left away from the fixed contacts 74 to open the related contacts 72. Therefore, the second operating stroke restores the contacts 72 to their normal open position.

In the event that there is no punch operating stroke in a column during a punching cycle of operation of the machine, there will be no movement of the slidable latch 80 and the contacts 72 will remain open, as shown in Fig. 5.

The contact condition may be summarized as follows:

(1) Contacts 72 normally open;
(2) First punching stroke closes contacts 72;
(3) Second punching stroke opens contacts 72;
(4) Absence of punshing stroke retains contacts 72 open.

*Restoring mechanism*

It is, of course, desirable to restore all of the operated slide latches 80 to restore the contacts 72 to normal open position. To this end there is journaled in the side frame plates 65 and 66 a rock shaft 100 to which is attached by screws 101 (Fig. 5) the slotted inverted L-shaped plate 82. Attached to the rock shaft 100 is a forked arm 102 (Figs. 2 and 3) receiving a pin 103 of a double follower arm 104 pivoted on a stud 105. The double follower arm 104 has connected thereto a spring 106 which urges a roller 107 carried by the lower arm of double arm 104 against a profile cam 108 rotated by a cyclic operating shaft 109. Said cam rotates in a clockwise direction so that at the termination of the cycle after all of the punching operations have been effected the high part 110 of cam 108 engaging the roller 107 will rock the double arm 104 and through the arm 102 rock shaft 100 in a clockwise direction as shown in Fig. 5. The inverted L-shaped bar 82 now engaging all of the slide latches 80 will rock them slightly so as to disengage either the shoulder 94 or 96 from the projection 84, enabling spring 90 to elevate the slide latches 80 to the normal position where the projection 84 engages the shoulder 83 of the slide latch 80. If one or more of the slide latches 80 are in their normal position inverted L-shaped bar 82 will merely rock them slightly counterclockwise without, however, disengaging the first step shoulder 83 from the projection 84 of the knockoff bar 56. Therefore, it will be seen that all of the operated slide latches 80 are restored to normal position in readiness for the next cycle of operation.

*Wiring diagram*

The operation of the machine, so far as giving an indication whenever double punching or a blank column has been detected is concerned, will now be described in connection with the wiring diagram shown in Fig. 6 and timing diagram of Fig. 7.

It has been indicated that electrical impulses are transmitted to the punch magnets PM so as to perform the punching operation on the record. Any suitable control devices may be provided to transmit impulses thereto but preferably such impulses may be transmitted under control of read unit reading brushes RB in Fig. 3A in the aforementioned patent to G. F. Daly No. 2,531,783. These brushes are on the card reading side of the machine and when the machine is suitably plugged, impulses therefrom are transmitted to the punch magnets PM so as to effect a card reproducing operation. This is merely by way of example and the punch magnets PM may otherwise be impulsed. For the purposes of illustration, Fig. 7 shows adjacent "Read Unit Reading Brushes" the timing of the impulses representing R, X, 0, 1–9, it being well known that for numeral punching the 0–9 impulses punch the card at the appropriate index point positions.

It has been previously stated that a set of contacts 72 are provided for each of the eighty card columns. In the event that certain columns are not to be checked, a shunt plug connection 115 is used which, as shown in Fig. 6 by way of example, cuts out columns 5 to 41; the remaining card columns 1 to 4 and 42 to 80 being used for checking purposes with all their normally open contacts 72 in series. Current is provided by the line sides 116 and 117. Shortly after the last punching stroke, which would be effected for punching out the 9 index point position, cam contacts DPP4 close, and if all of the contacts 72 have been closed a circuit is completed from line side 116, through cam contacts DPP4, through the effective series of contacts 72 now all closed, the pickup coil P of a duo-wound relay DP2, to the line side 117. Hold contacts DP2–1 now close, thereby extending the hold circuit for the H coil through contacts DP2–1 and cam contacts DPP2 back to the line side 116.

It will be seen from Fig. 7 that cam contacts DPP2 hold the relay DP2 energized over to the 0 cycle point of the next cycle. Before cam contacts DPP2 open, test cam contacts DPC1 close and if the DP2–2 relay contacts have been closed test cam contacts DPC1 will transmit an impulse to energize DP3 relay by an obvious circuit. When DP3 relay coil is picked up its hold coil H is energized through the DP3–1 normally open contacts now closed back through cam contacts DPP3 to the line side 116. This will hold DP3 relay coil energized up to point 12.5 of the next further cycle during which further cycle the card is directed to the stacker station. Upon an indication that punching has been properly performed in all of the card columns DP3 relay will be energized to transfer its contacts DP3–1 and prevent DPP3 cam contacts from closing an obvious circuit through the normally closed contacts DP3–1 to light a signal light 118.

However, if one of the contacts 72 in the column to be tested is open, either as a result of a blank punching in the associated column, or a double punching in that column, the DP2 relay will not be energized, its contacts DP2–2 will remain opened and DP3 relay will not be energized. Relay DP3 may exercise any suitable control over the machine such as offsetting the erroneous card, stopping the machine or giving a signal to indicate to the operator that erroneous punching has been effected. In the present machine a suitable indication of error may be the lighting of the lamp 118 and this is performed by a circuit from the line side 116 through cam contacts DPP3, through the normally closed DP3–1 relay contacts through the signal lamp 118, to the line side 116.

It is also desirable to stop the machine when an error in punching has been ascertained and after the incorrect card has been disposed in the stacker in said further next cycle. This may be conveniently performed by inserting contacts DP3–2 in the running circuit of the motor relay R10 shown in Fig. 33*a* of the patent to G. F. Daly No. 2,531,873. Said contacts DP3–2 are closed as long as no error has been located and R10 motor relay running circuit is maintained completed. Obviously, upon locating an error, contacts DP3–2 open, breaking the circuit to the R10 motor start relay just as if the stop key of the machine shown in the aforementioned patent was depressed. The stopping of the machine will leave the card improperly punched in the stacker where it may be retrieved by the operator and examined to determine the column having the faulty punching.

Upon restarting the machine, a key 120 is depressed which closes an obvious circuit to the H coil of DP3, thus transferring the DP3–1 contacts and opening the signal circuit. The key 120 is retained depressed until cam contacts DPP3 open.

Fig. 7 also shows the timing of the cam 108, it being noted that after closure of the cam contacts DPP4 the high part of said cam is effective to restore all of the slide latches 80 which happen to be off normal position.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a punching machine, in combination, a plurality of punches, punch actuating means for operating said punches a predetermined number of times or in excess of said predetermined number of times, means controlled by the operation of said plurality of punches and having two conditions determined by the operation of said punches a predetermined number of times or in excess of said predetermined number of times, and means controlled by said last named means for manifesting in accordance with one of the conditions of said last named means whether any punch has been operated in excess of said predetermined number of times.

2. In a punching machine, in combination, a plurality of punches, punch actuating means for selectively operating each of said punches once or a plurality of times, means controlled by the operation of said plurality of punches and having two different conditions in accordance with the operation of said punches once, or a plurality of times, and means controlled by said last named means for signifying in accordance with the conditions of said last named means whether each punch has been operated once or any punch has been operated a plurality of times.

3. In a punching machine, in combination, a plurality of punches, punch actuating means for selectively operating each of said punches once, a plurality of times, or not operating a punch, means controlled by the operation of said punches and having two different conditions, one (*a*) in accordance whether each punch has been operated once, and another (*b*) in accordance whether any punch has been operated a plurality of times or has not been operated, and means controlled by said last named means for signifying in accordance with the two different conditions of said last named means whether (*a*) each punch has been operated once, or (*b*) any punch has not been operated or has been operated a plurality of times.

4. In a punching machine, in combination, a plurality of punches, punch actuating means for selectively operating each of said punches once, or not operating a punch, means controlled by the operation of said punches and having two different conditions, one determined by the operation of said punches once, and another determined by the inoperation of one of said punches, and means controlled by said last named means for signifying in accordance with the two different conditions of said last named means whether all punches have been operated once, or any punch has not been operated.

5. In a machine operable in conjunction with punched cards which are adapted to receive in each column a single punched hole for proper punching, and wherein a plurality of punched holes in the same column or the absence of a hole indicates improper punching, a single row of punches, punch actuating means for selectively operating the associated punch once to represent one of the digits 0–9, or a plurality of times to represent a combination of digits, means controlled solely by the operation of said punches and having two different conditions, one in accordance with the operation of said row of punches each once, and another in accordance with the operation of a punch a plurality of times, or its unoperation, and error manifesting means controlled by said last named means in accordance with its different conditions for manifesting whether any punch of the single row has been operated a plurality of times, or has failed to operate.

6. In a machine operable in conjunction with punched cards which are adapted to receive a single punched hole for proper punching, and wherein a plurality of punched holes in the same column or the absence of a hole indicates improper punching, a single row of punches, punch actuating means, punch interposers, means for selectively positioning the punch interposers for causing the punch actuating means to operate the associated punch once to represent one of the digits 0–9, or a plurality of times to represent a combination of digits, means controlled by the positioning of said interposers and having two different conditions, one in accordance with the positioning of said interposers once, and another in accordance with the positioning of one of said interposers a plurality of times, or its failure to be positioned to select a punch for operation, and means controlled by said last named means for manifesting in accordance with the different conditions whether any interposer of the single row has been positioned once, or a plurality of times, or has failed to be positioned.

7. In a machine operable in conjunction with punched records which are adapted to receive in each column a single punched hole for proper punching, and wherein a plurality of punched holes in the same column indicates improper punching, punches, punch actuating means for selectively operating the punches to punch one hole in a column, or a plurality of holes in a column, a plurality of electrical contacts, means operated by said punches to close said plurality of contacts when said punches punch a single hole in each column, and to cause one of said contacts to be opened when one of said punches punch a plurality of holes in a column, and a checking circuit including a serial connection for said contacts which is completed when all of said contacts are closed to show that said punches have punched only a single hole in each column, and which is opened by the opening of said contacts to show that one of said punches has punched a plurality of holes in a column.

8. In a machine for successively punching cards in columns while the cards are being fed past a punching mechanism, means for actuating said punches, interposer means operable in timed relationship with the feeding of the card to selectively connect the associated punch with said actuating means for effecting one or a plurality of punch strokes of said punch to punch one or more holes in a related card column, a plurality of contacts, one for each punch, means operated by each of said interposers to cause associated contacts to assume one position for one punching stroke, and to cause said contacts to assume a different position for a plurality of punch strokes, and means to transmit a test impulse through said contacts to determine if any of said contacts has assumed said different position.

9. In a machine for punching cards in columns, reciprocable punches one for each column, means for feeding said cards past said punches to present index point positions 0–9 to said punches, means for actuating said punches, means operable in timed relationship with said card feeding means to selectively connect the associated punch with said actuating means for effecting one or a plurality of punch strokes of said punch to punch one or more holes in a related card column, a plurality of contacts, one for each punch, means operated by each of said punches to cause associated contacts to assume one position for one punching stroke, and to cause said contacts to assume a different position for a plurality of punch strokes, means for serially connecting said contacts, and means to transmit a test impulse through said contacts to determine if any of said contacts has assumed said different position.

10. In a machine for punching cards in columns, reciprocable punches one for each column, means for feeding said cards past said punches to present the index point positions successively to said punches, means for actuating said punches, interposer means operable in timed relationship with said card feeding means to selectively connect the associated punch with said actuating means for effecting one or a plurality of punch strokes of said punch to punch one or more holes in a related card column, a plurality of contacts, one for each punch, means comprising a slidable latch plate operated by each of said interposers and having successive latched positions to cause associated contacts to assume one position for one punching stroke, and to cause said contacts to assume a different position for a plurality of punch strokes, means for latching the slidable latches in their successive positions, means for serially connecting said contacts, means to transmit a test impulse through said contacts to determine if any of said contacts has assumed said different position, and means for moving all of said slidable latch plates to unlatching position after the transmission of said test impulse.

11. In a machine for punching cards in columns, reciprocable punches, one for each column, means for feeding said cards past said punches to successively present the index point positions to said punches, means for actuating said punches, means operable in timed relationship with said card feeding means to selectively connect the associated punch with said actuating means for effecting one or a plurality of punch strokes of said punch to punch one or more holes in a related card column, a plurality of contacts, one for each punch, means operated by each of said punches to cause associated contacts to assume and hold one position for one punching stroke, and to cause said contacts to assume and hold a different position for a plurality of punch strokes, means for latching each of said last named means to cause the related contacts to hold the positions assumed, means for serially connecting said contacts, means to transmit a test impulse through said contacts while held in their assumed positions to determine if any of said contacts has assumed said different position, and means operable after the test impulse has been transmitted for unlatching said latching means to cause said contacts to be restored to normal positions.

12. In a cyclically operable punching machine, in combination, a plurality of punches, punch actuating means, controlling means for operating said punch actuating means and said punches to punch a predetermined number of holes or in excess of said predetermined number of holes, means controlled solely by the operation of said punches and having one status when said punches have punched said predetermined number of holes and another status when said punches have punched holes in excess of said predetermined number of holes, and means controlled by said last named means to manifest, in accordance with the status of said last named means, whether said punches have punched said predetermined number of holes, or in excess of said predetermined number of holes.

References Cited in the file of this patent

UNITED STATES PATENTS

| | | |
|---|---|---|
| 2,554,549 | Albert et al. | May 29, 1951 |
| 2,614,632 | Clos | Oct. 21, 1952 |
| 2,647,580 | Connolly | Aug. 4, 1953 |
| 2,684,718 | Luhn | July 27, 1954 |